(No Model.)
A. F. DAVIS.
FODDER MACHINE.
No. 535,892. Patented Mar. 19, 1895.
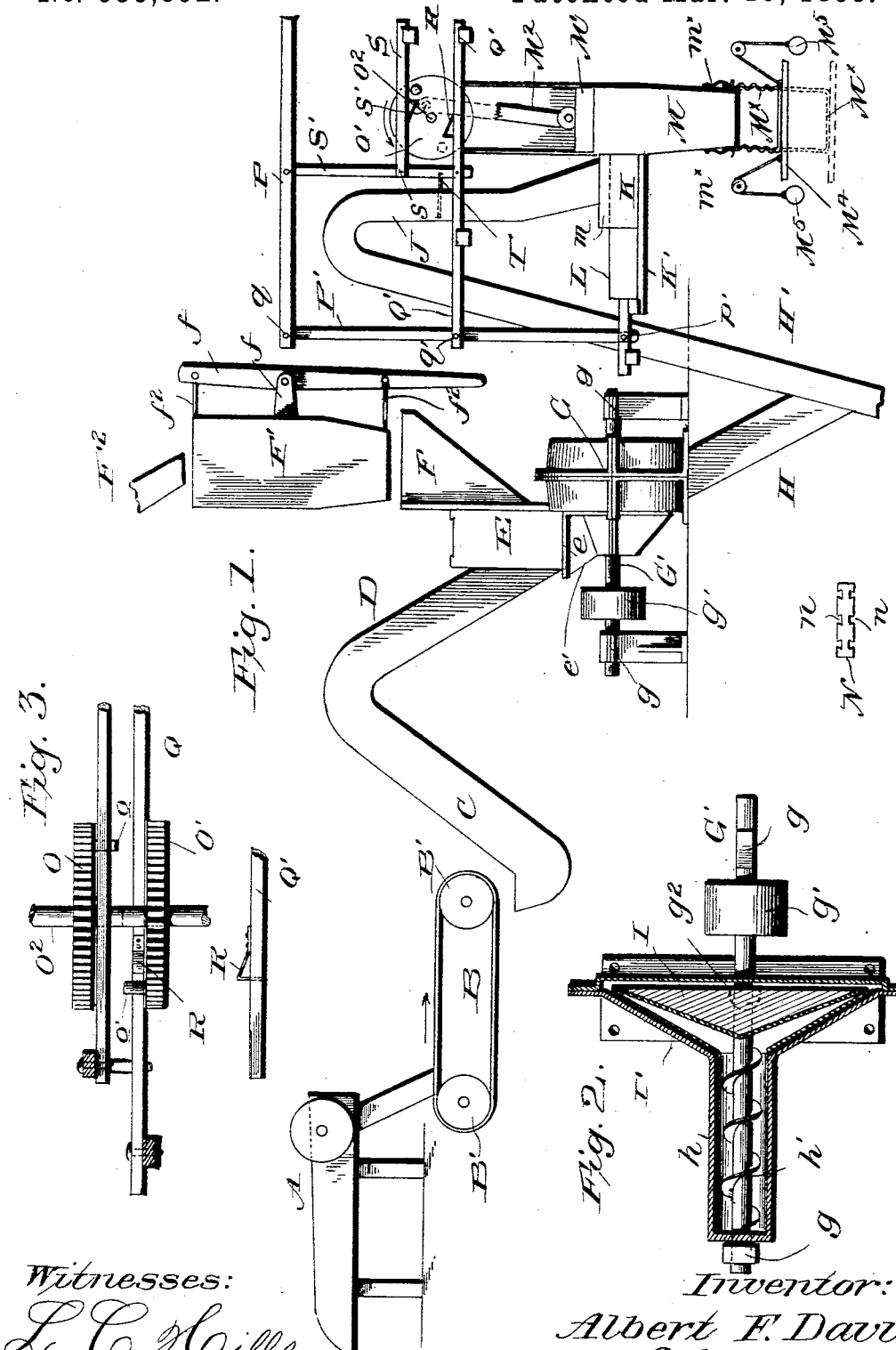
Witnesses:
L. C. Hills
E. A. Bond
Inventor:
Albert F. Davis
by E. B. Stocking
Attorney.

UNITED STATES PATENT OFFICE.

ALBERT F. DAVIS, OF RUTLAND, VERMONT.

FODDER-MACHINE.

SPECIFICATION forming part of Letters Patent No. 535,892, dated March 19, 1895.

Application filed September 4, 1894. Serial No. 522,052. (No model.)

*To all whom it may concern:*

Be it known that I, ALBERT F. DAVIS, a citizen of the United States, residing at Rutland, in the county of Rutland, State of Vermont, have invented certain new and useful Improvements in Fodder-Machines, of which the following is a specification, reference being had therein to the accompanying drawings.

This invention pertains to an apparatus or mechanism for preparing fodder and baling the same, and it has for its objects among others to provide a simple, cheap and efficient mechanism or machine for cutting, mixing together, grinding, weighing and baling hay and grain, or other materials or substances in such proportions as may be desired and this preferably automatically.

The invention is designed primarily as an improvement upon the construction forming the basis of my application filed October 7, 1893, Serial No. 487,479, and it consists in certain features of construction which render the device more complete and efficient in its operation, and whereby the fodder after it leaves the grinding mill is compressed and baled. The cut material and the grain are fed or conveyed to a rotary mill which is provided with a large receiving aperture which allows the cut hay to descend rapidly to the center of the mill without danger of clogging. Automatically operated plungers are provided for forcing the material into the delivery spout and compressing the same into bales.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is an elevation of my improved machine with a portion broken away to better disclose other parts. Fig. 2 is a sectional plan of one form of grinding mill which I may sometimes employ in connection with the other parts of my apparatus. Fig. 3 is a detail of the pinions and slides, a portion of one of the slides with its spring latch being shown detached.

Like letters of reference indicate like parts throughout the several views.

Referring now to the details of the drawings by letter, A designates a cutter designed to cut hay, green trees or bushes and the like, this cutter being of any of the well known forms suited for this purpose. It may be like that shown in my prior application above referred to if desired.

B is a conveyer of any suitable form, in this instance shown as composed of a belt passed over the rollers B' driven from any source, and arranged to deliver the cut material as it comes from the cutter A to the elevator spout C in which is designed to be arranged an elevator of suitable construction and which serves to convey the material from the conveyer to the spout D down which it falls into the hopper or receptacle E which is supported upon a bracket $e$ on the side of the mill casing as seen in Fig. 1.

F is a hopper designed to receive the grain from the grain-box F' and which hopper is supported on and by the hopper E and empties thereinto. The aperture or opening from the hopper E into the mill is made very large, some four or five times as large as is the case in rotary grinding mills as usually constructed, so that the cut hay and other materials may easily pass from the hopper into the mill without danger of clogging. This opening leads through the extension $e'$ of the casing of the mill as seen in Fig. 1. The grain-box F' may be provided with any suitable means for measuring or weighing the grain therein and which is allowed to pass into the grain hopper F to be mixed with the cut material. In this instance it is shown as provided with a lateral arm or lug $f$ to which is pivoted a vertically-disposed lever $f'$ carrying the slides $f^2$ one at the top and one at the bottom and adapted to reciprocate in opposite directions by the movement of the said lever, the said grain-box being designed to receive grain from a spout $F^2$ as indicated in Fig. 1.

The mill G may be of any suitable form capable of performing the functions required of it, and in Fig. 1 is shown as having a casing in sections mounted upon a support and the shaft G' of the mill mounted in suitable bearings $g$ and provided with a drive pulley $g'$. The outlet from the mill is in line with the inclined spout H which empties into the elevator spout H'.

In Fig. 2 I have shown a modified form of mill in which the shaft is extended and works through a trough $h$ and carries a screw $h'$ which may be employed for conveying the cut hay from the cutter A to the mill, the conveyer B and elevator C in this instance being dispensed with. In said Fig. 2 the discharge opening $g^2$ from the mill is indicated by dotted lines and is directly over the spout H. The disk I of the mill as well as the outer shell or case are provided with chilled iron or steel plates I' removably secured in position so as to be readily removed and replaced by new ones when necessary. A cutter may be mounted directly over the screw so as to be portable therewith and the hopper E in this instance would be supported upon the casing of the screw or from a bracket on the casing of the mill as in the form shown in Fig. 1.

The elevator within the spout H' conveys the mixed hay and grain which are mixed within the hopper E and ground to the required degree of fineness by the mill, to the spout J, the lower or discharge end of which is preferably widened as shown in Fig. 1, and which empties into the receptacle K in which is fitted to slide horizontally the plunger L which is designed to push the material into the packing chamber M. This plunger is mounted to reciprocate above or upon the table or support K' and is actuated in a manner which will soon be set forth. A space $m$ is provided for the introduction of partitions N having the slots or grooves $n$ for the binding wires of the bales and which partitions serve to divide or separate the bales.

M' is a plunger working in the packer box M and operated by the rod or arm $M^2$ which is actuated by suitable connection with one of the gears O O' mounted on a shaft $O^2$ supported in suitable bearings, and these gears are provided preferably upon their adjacent faces with the horizontally projecting pins or projections $o$ and $o'$, and these pins or projections are designed to operate as follows:—P is a support or timber to which is pivoted as at $q$ one end of the vertical arm P' the other end of which is pivotally connected as at $p'$ with the arm of the plunger L which arm is designed to be suitably guided in its movements, and between its ends the arm P' has pivotally connected therewith as at $q'$ the horizontal slide Q' which is mounted to reciprocate in suitable bearings or guides and which carries a spring latch R as shown best in Fig. 3 which is adapted to be engaged by one of the pins on the gears as will soon be explained.

S is a slide mounted to reciprocate in suitable bearings and pivotally connected at one end as at $s$ with a vertical arm S' which is pivoted at its upper end to the bar P while its lower end is connected in any suitable manner with the slide Q' as seen in Fig. 1. This slide carries a spring latch $s'$ which is arranged upon the under side of the slide as shown in Fig. 1 in position to be engaged by the pins on the gears. The arm S' carries a shut-off slide T working in guides in the spout J to cut off the discharge of the material therefrom.

With the parts constructed and arranged substantially as above set forth the operation is as follows:—The hay, young trees or other material is fed to the cutter A where it is cut and from whence it falls upon the conveyer B and taken to the elevator C which delivers it to the spout D and down this spout it falls into the hopper E where it is mixed with the grain which is let into the said hopper in any desired quantity through the hopper F from the grain box F'. From the hopper E the cut material and grain pass through the large aperture into the mill where it is ground to the required degree of fineness and from the mill it falls into the spout H from which it is taken by the elevator H' to the spout J and from thence in measured quantities into the receptacle K from whence it is forced by the plunger L into the packer M where it is compressed and baled by the plunger M'. The gears are so timed in their movements that the plungers L and M' and the slides Q' and S with the shut-off slide T will be actuated just at the proper time so that as the plunger M' is receding from having compressed one bale another lot of material is being forced into the packer by the plunger L and as the latter recedes the plunger M' descends to compress the material thus forced out of the receptacle K into the packer. The slides are reciprocated by means of the pins on the gears engaging the latches thereof. The partitions N are fed in through the space $m$ and fall with the material into the packer so as to separate the bales.

Modifications in detail may be resorted to without departing from the spirit of the invention or sacrificing any of its advantages. For instance, the end of the packer box M may be provided with some means as the springs $m^x$ for holding a sack or bag $M^x$ in position to be filled, and this bag may be supported upon a platform $M^4$, as seen in Fig. 1, which is counterbalanced by the weights $M^5$ on the cords or ropes which pass over suitable pulleys as shown.

What is claimed as new is—

1. In a fodder-preparing apparatus, the combination of a cutter, a grinding mill, means for supplying grain and the material from the cutter to said mill, a packer, and means for operating the plungers thereof and for controlling the supply to said packer, substantially as specified.

2. In a fodder-preparing apparatus, the combination of a cutter, a grinding mill, means for delivering the cut material and grain to said mill, a baling mechanism, plungers mounted to reciprocate at right angles to each other to feed the material to the baling mechanism and compress it, a cut-off for the feed, and gears and connections for actuating the plungers and cut-off, substantially as specified.

3. In a fodder-preparing apparatus, the combination of a cutter, a grinding mill, a baling mechanism, a conveyer from the cutter to the mill, a conveyer from the mill to the baling mechanism, slides and connections, and gears and connections for simultaneously actuating the slides and the plungers of the baling mechanism, as set forth.

4. The combination of a cutting device, a grinding mill, a conveyer between the cutting device and mill, means for feeding grain to the mill, a packer, a conveyer between the mill and packer, plungers and cut off slides and a disk having projecting pins for actuating the slides, substantially as specified.

5. The combination with a packer device having springs for holding the sack, of a platform arranged beneath the packer box, cords connected with said platform and passed over pulleys and counterbalanced weights on the ends of said cords, substantially as specified.

6. In a fodder preparing apparatus, the combination with the packing chamber and the spout leading thereto, of the plunger, the gears with projecting pins, and the slides with latches adapted to be engaged by said pins to reciprocate the slides, as set forth.

7. In a fodder preparing apparatus, the combination of the baling chamber, the plunger working therein, the gears with projecting pins, the slides with latches oppositely-disposed, the cut-off, and the pivoted arms to which the slides and cut-off are connected, as set forth.

8. In a fodder-preparing apparatus, the combination of the packer chamber, its plunger, the gears with oppositely-disposed pins, the plunger arm connected with one of the gears, the slides with oppositely-disposed spring latches, the cut-off and the vertical pivoted arms to which the cut-off and slides are pivotally connected, substantially as specified.

In testimony whereof I affix my signature in presence of two witnesses.

ALBERT F. DAVIS.

Witnesses:
WILLIAM W. WOOD,
SAMUEL C. DEEDEY.